United States Patent
Chae et al.

(10) Patent No.: US 8,145,138 B2
(45) Date of Patent: Mar. 27, 2012

(54) APPARATUS AND METHOD FOR REMOVING INTERFERENCE IN MULTIPLE ANTENNA SYSTEM

(75) Inventors: Heon-Ki Chae, Seongnam-si (KR); Keun-Chul Hwang, Yongin-si (KR); Soon-Young Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 426 days.

(21) Appl. No.: 12/383,144

(22) Filed: Mar. 20, 2009

(65) Prior Publication Data
US 2009/0239472 A1    Sep. 24, 2009

(30) Foreign Application Priority Data
Mar. 21, 2008  (KR) .................. 10-2008-0026196

(51) Int. Cl.
*H04B 1/00*  (2006.01)
*H04B 7/00*  (2006.01)

(52) U.S. Cl. ....... 455/69; 455/63.1; 455/422.1; 375/222
(58) Field of Classification Search .............. 455/69, 455/422.1; 375/222
See application file for complete search history.

(56) References Cited

U.S. PATENT DOCUMENTS

2007/0280340 A1*  12/2007  Hwang et al. .................. 375/222
* cited by examiner

*Primary Examiner* — Lincoln Donovan
*Assistant Examiner* — John Poos (57) ABSTRACT

Provided are an apparatus and a method for removing an interference in a multiple antenna system. The apparatus includes a channel estimator, a covariance matrix generator, a weight calculator, and a beam forming unit. The channel estimator estimates a channel for a service cell and an interference channel for an adjacent cell using sounding signals via a plurality of antennas. The covariance matrix generator generates a covariance matrix as an average value from the interference channel. The weight calculator calculates a beam coefficient using the covariance matrix. The beam forming unit forms a beam using the beam coefficient.

20 Claims, 9 Drawing Sheets

APPARATUS AND METHOD FOR REMOVING INTERFERENCE IN MULTIPLE ANTENNA SYSTEM

CROSS-REFERENCE TO RELATED APPLICATION(S) AND CLAIM OF PRIORITY

The present application claims priority under 35 U.S.C. §119 to an application filed in the Korean Intellectual Property Office on Mar. 21, 2008 and assigned Serial No. 10-2008-0026196, the contents of which are incorporated herein by reference.

TECHNICAL FIELD OF THE INVENTION

The present invention relates to a multiple antenna system and, more particularly, to an apparatus and a method for performing beamforming in order to remove an interference using a plurality of antennas.

BACKGROUND OF THE INVENTION

In a wireless communication system of a multiple cell environment using the same frequency, adjacent cell interference is generated in a cell overlapping region. In this case, an interference signal has an influence on a signal of users inside a relevant cell and reduces a demodulation performance of user terminals.

Therefore, the wireless communication system uses two techniques in order to remove adjacent cell interference. First, a reception end of the wireless communication system removes an interference signal from a received signal using an interference removing technique, and then performs demodulation. Next, a transmission end of the wireless communication system can reduce the strength of an interference signal influencing an adjacent cell by removing a beam pattern formed in an interference direction using a transmission beam forming technique. For the transmission end to form a beam, channel information associated with users providing service should be known every moment.

In the case where the wireless communication system uses a Time Division Duplex scheme, a downlink channel and an uplink channel of the Time Division Duplex system have the same channel reciprocity. Therefore, the transmission end performs beamforming for a downlink using channel information estimated through sounding signals received from users.

Figure 1:
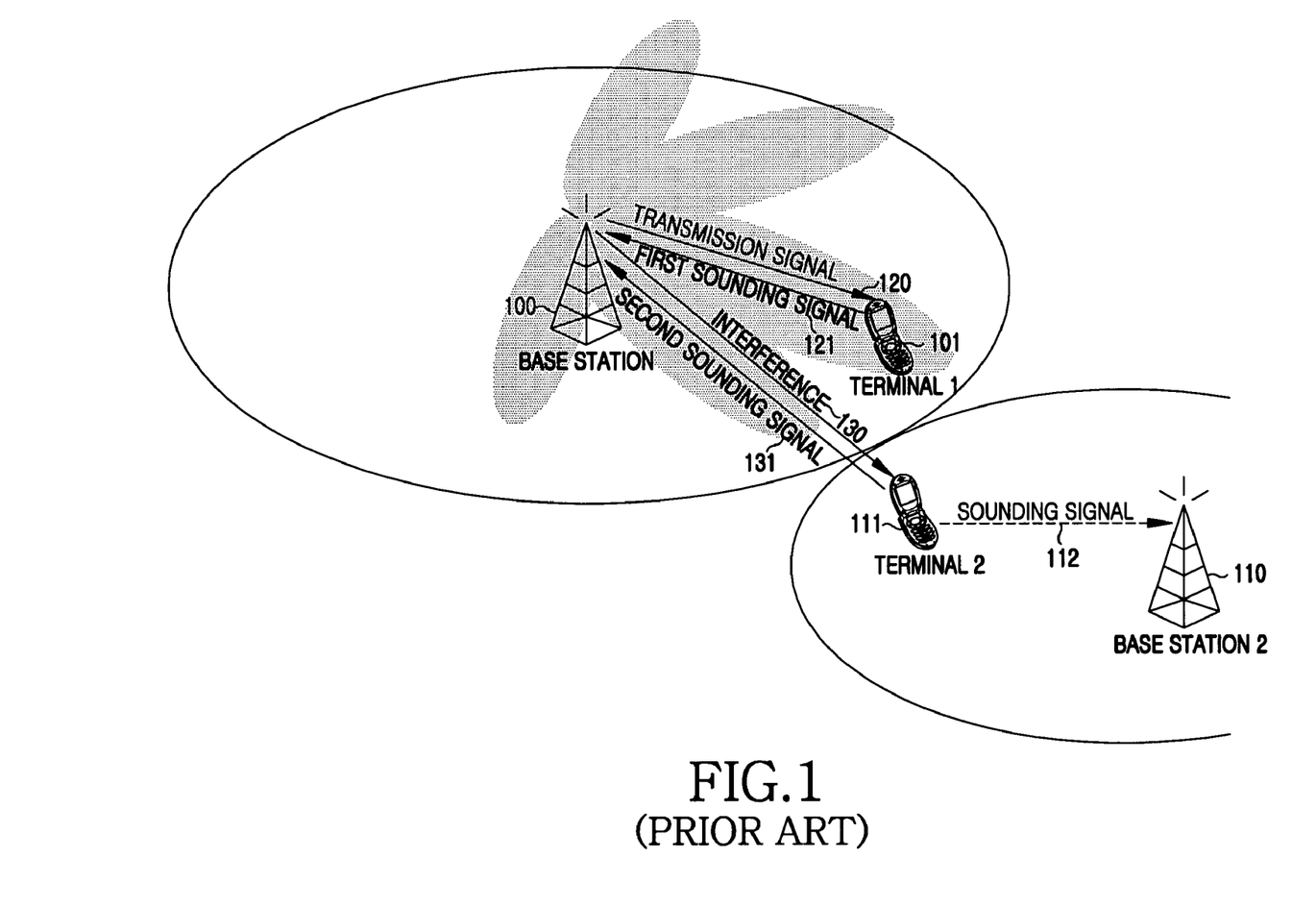
FIG. 1 illustrates and example of the construction of forming a beam without consideration of interference in a conventional wireless communication system.

FIG. 1 illustrates the construction of forming a beam without consideration of interference in a conventional wireless communication system.

Referring to FIG. 1, a terminal1 101 receives service from a base station1 100 in a service area of the base station 100, and a terminal2 111 receives service in a service area of a base station2 200.

At this point, the base station1 100 forms a beam and transmits a signal 120 to the terminal1 101. Here, to form the beam, the base station 100 receives a first sounding signal 121 from the terminal1 101 and should estimate an uplink channel. Depending upon realization, the terminal1 101 may receive a pilot or a preamble of a downlink, estimate a channel, and then feed back the estimated channel to the base station1 100. Similarly, the base station2 110 receives a sounding signal 112 from the terminal2 111, estimates a channel, forms a beam, and then transmits data.

In the case where the base station1 100 forms a beam without consideration of an interference, a signal transmitted by the base station1 100 operates as a large influence 130 on the terminal2 111.

As described above, after estimating a channel (at this point, a channel estimation error may occur) using sounding signals 121 and 131 transmitted from the terminal1 101 and the interference terminal2 111, the base station1 100 controls a signal such that the signal does not reach in the direction of the interference terminal2 110 as much as possible, calculates a beam coefficient that can send signals to the terminal1 101 as much as possible, and forms a beam. The first sounding signal 121 of the terminal1 101 is a signal assigned and transmitted from the base station1 100 currently in service. The second sounding signal 131 of the interference terminal2 110 is a signal that is a sounding signal assigned from the base station2 110 and reaches the base station1 100 currently in service.

Figure 2:
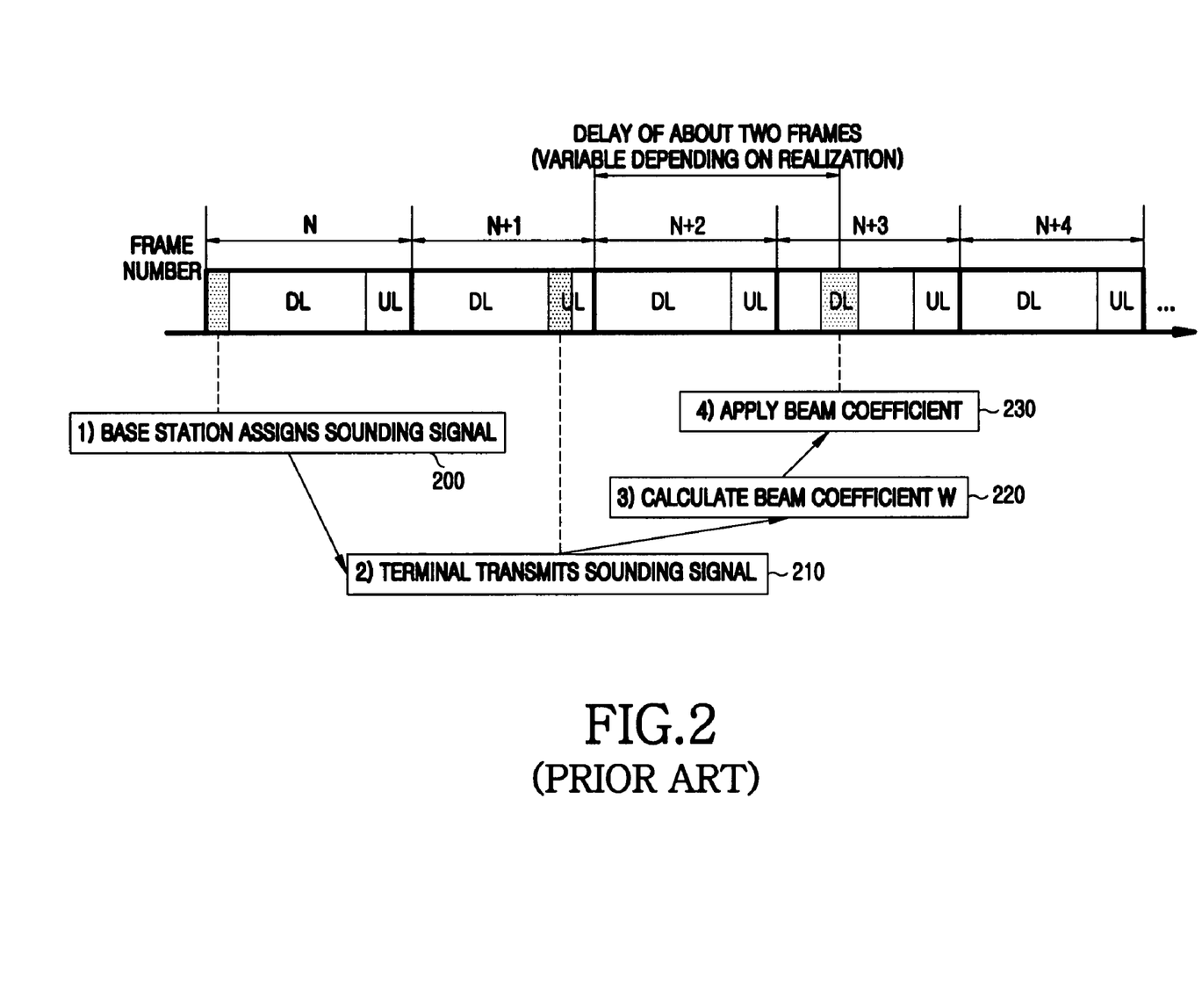
FIG. 2 illustrates and example beam coefficient application delay.

Also, referring to FIG. 2, to perform beamforming for interference cancellation, a beam coefficient should be calculated and applied to each antenna. At this point, a time delay occurs.

FIG. 2 illustrates a delay until a base station performs a procedure of calculating a beam coefficient and a procedure of applying a beam coefficient.

Referring to FIG. 2, a base station assigns a sounding signal to a relevant terminal through a downlink frame region during an n frame 200. The terminal transmits the sounding signal to the base station through an uplink frame region during an n+1 frame 210. A beam coefficient is calculated during an n+2 frame 220. A beam can be formed by applying a beam coefficient from an n+3 frame 230. Therefore, a delay of about two frames occurs.

At this point, the time delay may be added to a channel estimation error that uses a sounding signal such that nulling may be directed to a different direction, not an interference direction; or a nulling width is not sufficiently large and, therefore, interference is not removed. Therefore, when a channel between a terminal and a base station changes fast, a conventional method has a limitation that an interference removing effect drops down.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an object of the present invention is to provide an apparatus and a method for improving an interference removing performance depending on a time delay and a channel estimation error in a multiple antenna system.

According to an aspect of the present invention, an apparatus for removing an interference to a terminal that receives service from a different base station when forming a beam in a multiple antenna system includes: a channel estimator for estimating a channel for a service cell and an interference channel for an adjacent cell using sounding signals via a plurality of antennas; a covariance matrix generator for generating a covariance matrix using an average value from the interference channel; a weight calculator for calculating a beam coefficient using the covariance matrix; and a beam forming unit for forming a beam using the beam coefficient.

According to another aspect of the present invention, an apparatus for removing an interference to a terminal that receives service from a different base station when forming a beam in a multiple antenna system includes: a channel estimator for estimating a channel for a service cell and an interference channel for an adjacent cell using sounding signals via a plurality of antennas; a covariance matrix generator for generating a covariance matrix by applying a ray perturbation method to the interference channel for each antenna; a weight calculator for calculating a beam coefficient using the covariance matrix; and a beam forming unit for forming a beam using the beam coefficient.

According to still another aspect of the present invention, a method for removing an interference to a terminal that receives service from a different base station when forming a beam in a multiple antenna system includes: estimating a channel for a service cell and an interference channel for an adjacent cell using sounding signals via a plurality of antennas; generating a covariance matrix using an average value from the interference channel; calculating a beam coefficient using the covariance matrix; and forming a beam using the beam coefficient.

According to yet another aspect of the present invention, a method for removing an interference to a terminal that receives service from a different base station when forming a beam in a multiple antenna system includes: estimating a channel for a service cell and an interference channel for an adjacent cell using sounding signals via a plurality of antennas; generating a covariance matrix by applying a ray perturbation method to the interference channel for each antenna; calculating a beam coefficient using the covariance matrix; and forming a beam using the beam coefficient.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terminologies described below are defined with consideration of functions in the present invention and can change depending on the intention or practice of a user or operator. Therefore, the definitions should be determined on the basis of the descriptions over the specification.

Exemplary embodiments of the present invention provide an apparatus and a method for forming a beam with consideration of interference from an adjacent cell in a multiple antenna system. Particularly, exemplary embodiments of the present invention provide an apparatus and a method for obtaining a covariance matrix for each tone or band as an average value (illustrated in FIG. 3), or obtaining a covariance matrix by applying a ray perturbation method to an interference matrix value for each tone (illustrated in FIG. 4), and forming an interference cancellation beam.

Figure 3:
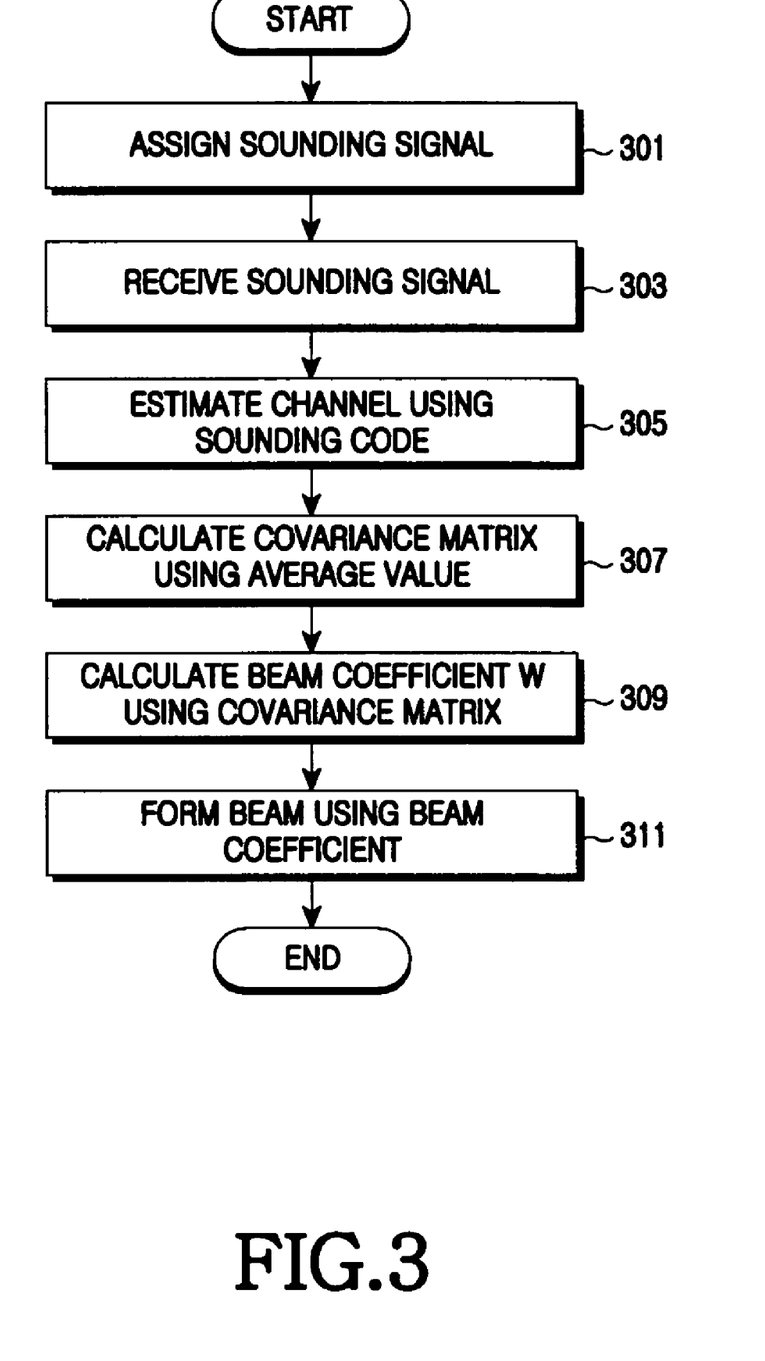
FIG. 3 illustrates a flow chart for a procedure of removing an interference in a multiple antenna system according to an exemplary embodiment of the present invention.

FIG. 3 illustrates a procedure of removing interference in a multiple antenna system according to an exemplary embodiment of the present invention.

Referring to FIG. 3, in step 301, a base station assigns a resource for a sounding code to terminals located in a service cell area, and in step 303, receives sounding codes from relevant terminals. The base station can receive a sounding code serving as interference from adjacent terminals located in service cell areas of other base stations.

After that, in step 305, the base station estimates an uplink channel using a sounding code. In step 307, the base station calculates a covariance matrix R using an average value from a corresponding estimated channel matrix.

Signals received from a first terminal. located in the service cell area of the base station, and a second terminal, located in the service cell area of a different base station, are given by Equation 1:

$$r(m)=h^d(m)c^d(m)+h^i(m)c^i(m)+n(m). \quad \text{[Eqn. 1]}$$

In Equation 1, r(m) is a base station reception signal, $h^d(m)$ is a first channel matrix, $h^i(m)$ is a second channel matrix, $c^d(m)$ is a first sounding code, $c^i(m)$ is a second sounding code, n(m) is a noise, and m is a tone index. The first channel matrix is a channel matrix (hereinafter referred to as a "desired channel") between the base station and the first terminal, and the second channel matrix is a channel matrix (hereinafter referred to as an "interference channel") between the base station and the second terminal. The first sounding code is a sounding code transmitted by the first terminal, and the second sounding code is a sounding code transmitted by the second terminal.

Here, estimation of a first channel is given by Equation 2 below, and estimation of a second channel is given by Equation 3 below:

$$h_{est}^d = \frac{1}{18}\sum_{m=0}^{17} r(m)c^d(m)^* \qquad \text{[Eqn. 2]}$$

In Equation 2, $h_{est}^d$ is an estimated first channel, r(m) is a reception signal, $c^d(m)$ is the first sounding code, and * is a conjugation operation. That is, the first channel can be estimated by multiplying a conjugate of the known first sounding code (since the base station assigns a sounding code, sounding code information of terminals can be known) by a reception signal, and an average value of first channel matrixes calculated for respective eighteen tones is calculated. Eighteen tones are provided according to an exemplary embodiment, and an average value of the first channel matrixes can be calculated for N tones or each band depending on realization.

$$h_{est}^i(m) = r(m) - h_{est}^d c^d(m). \qquad \text{[Eqn. 3]}$$

In Equation 2, $h_{est}^i(m)$ is an estimated second channel, r(m) is a reception signal, $h_{est}^d$ is an estimated first channel, and $c^d(m)$ is the first sounding code. In other words, the second channel can be obtained by removing only a signal $h_{est}^d c^d(m)$ of the first channel from a signal r(m) received from the base station.

Here, a covariance matrix R is calculated from the second channel estimated by Equation 3 above. The covariance matrix R is given by Equation 4 below. For convenience in description, the present invention obtains a covariance matrix on the basis of four antennas.

$$R = h_{est}^{iH} h_{est}^i + \sigma^2 I. \qquad \text{[Eqn. 4]}$$

In the case where the base station uses four antennas, a covariance matrix is given by Equations 5a and 5B:

$$R(m,t) = \begin{bmatrix} h_1 h_1^* & h_1 h_2^* & h_1 h_3^* & h_1 h_4^* \\ h_2 h_1^* & h_2 h_2^* & h_2 h_3^* & h_2 h_4^* \\ h_3 h_1^* & h_3 h_2^* & h_3 h_3^* & h_3 h_4^* \\ h_4 h_1^* & h_4 h_2^* & h_4 h_3^* & h_4 h_4^* \end{bmatrix}. \qquad \text{[Eqn. 5A]}$$

$$R(m) = \frac{1}{T}\sum_{t=0}^{T} R(m,t). \qquad \text{[Eqn. 5B]}$$

In Equation 5, m is a tone index, and R(m,t) is a covariance matrix for a tone index m at time t. Therefore, R(m) obtains a covariance matrix by an average value for each tone for a period T. The covariance matrix shows that an independent channel has an influence on a dependent channel.

An interference cancellation performance depending on a time delay and a channel estimation error can be raised by calculating a covariance matrix statistically, that is, calculating the covariance matrix as an average value for each predetermined tone.

Figure 6:
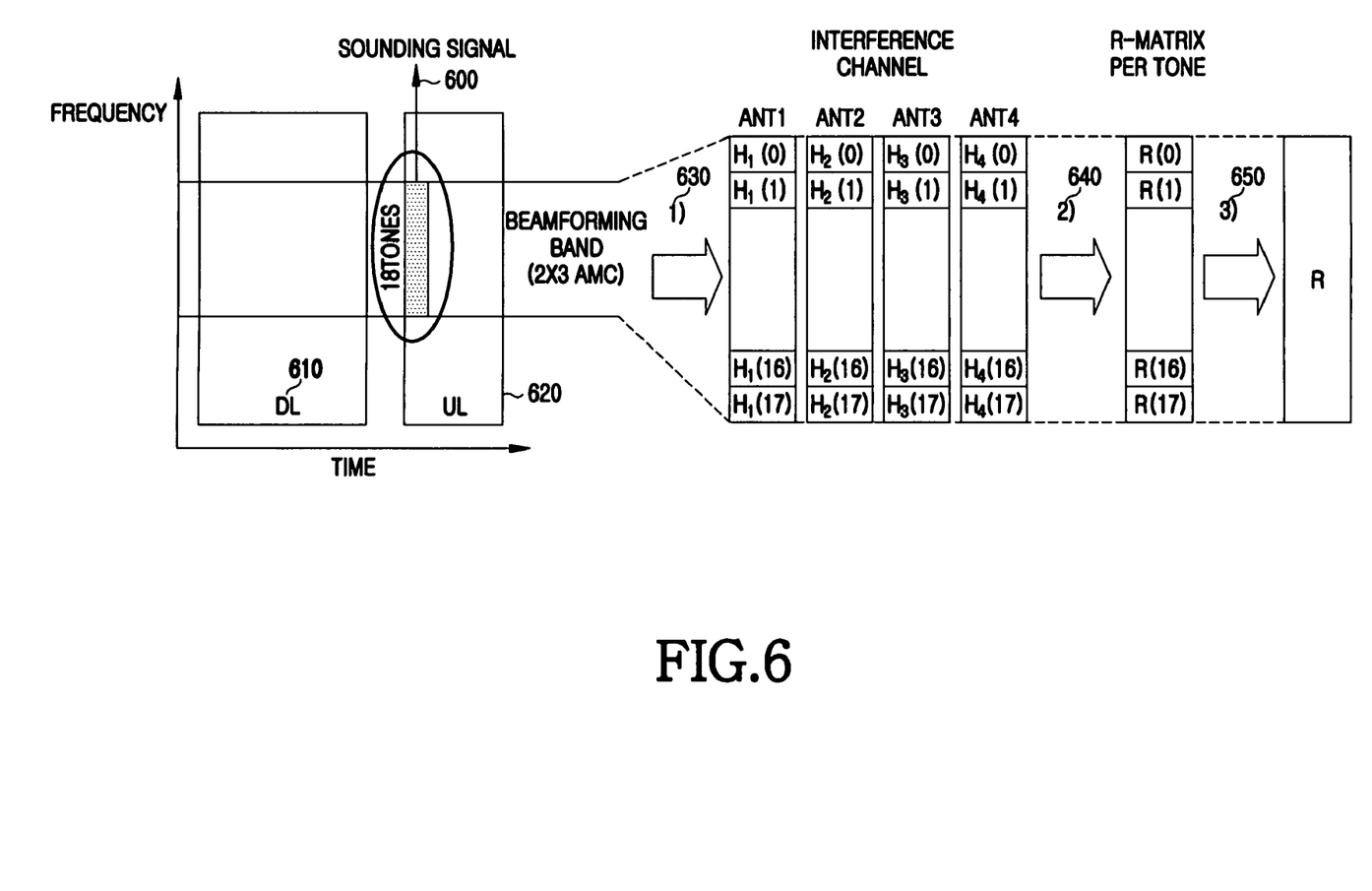
FIG. 6 illustrates an exemplary view of applying a sounding code in an OFDM frame structure according to an exemplary embodiment of the present invention.

FIG. 6 illustrates an example of applying a sounding code in an OFDM frame structure.

Referring to FIG. 6, an Orthogonal Frequency Division Multiplexing (OFDM) frame is divided into a downlink frame 610 and an uplink frame 620 by a time axis and a frequency axis. When a sounding code is assigned through a partial region of the downlink frame 610, the assigned sounding code is transmitted through a partial region 600 of the uplink frame. Here, a sounding code is transmitted via eighteen tones or eighteen subcarriers.

According to an exemplary embodiment of the present invention, an interference channel $h^i$ or a second channel is estimated 640 for each tone with respect to a beam-forming band region 630 for respective four antennas. Also, a covariance matrix R is calculated through the estimated interference channel 650.

After that, in step 309, the base station calculates a beam coefficient w using a covariance matrix R(m) with the average value. The beam coefficient is given by Equation 6:

$$w = h_d^H R^{-1}. \qquad \text{[Eqn. 6]}$$

In Equation 6, w is a beam coefficient, $h_d^H$ is a Hermitian matrix for a first channel, R is a covariant matrix, and $(\bullet)^{-1}$ denotes an inverse matrix operation.

Thereafter, in step 311, the base station forms a beam using a beam coefficient w and transmits data.

Then, the base station ends an interference cancellation procedure.

Figure 4:
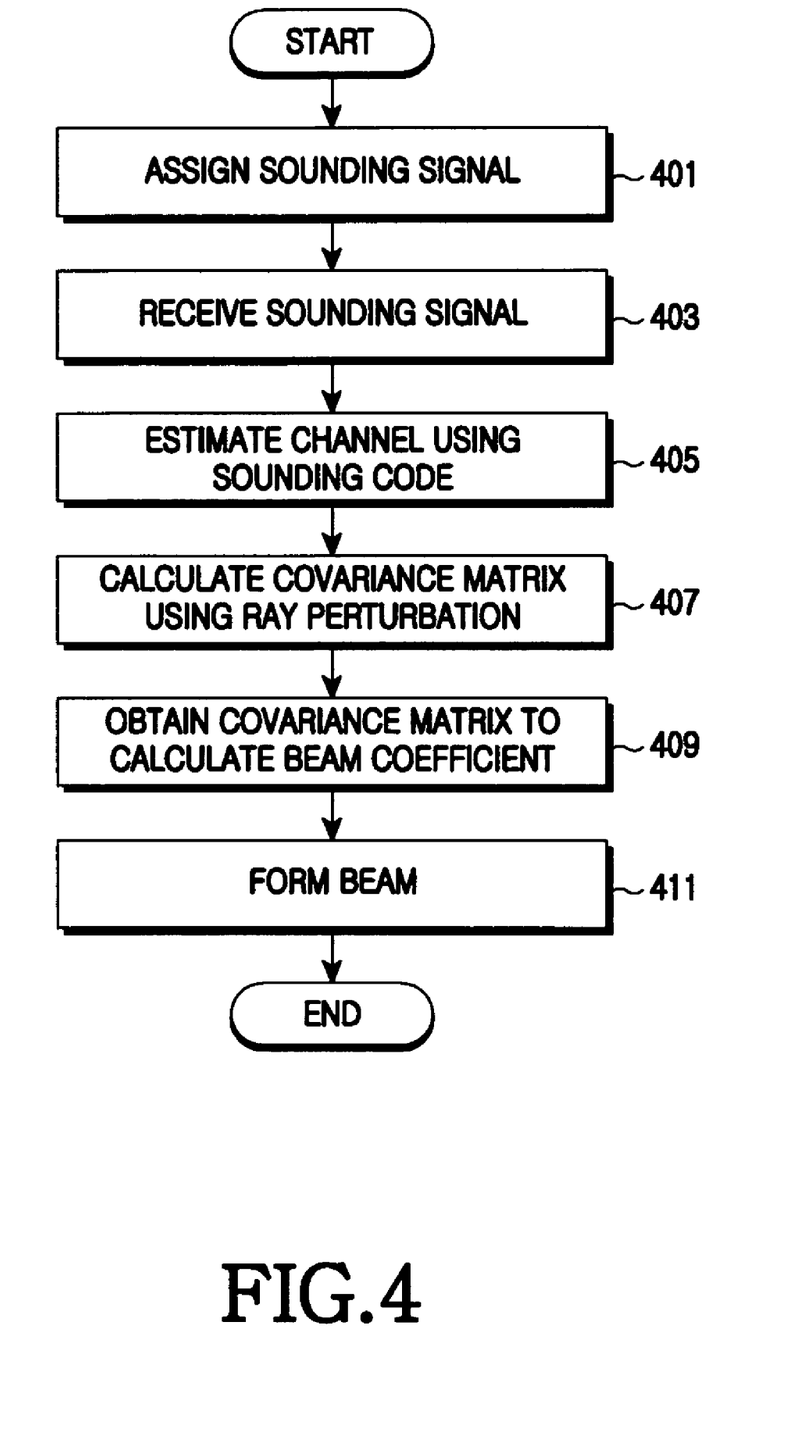
FIG. 4 illustrates a flow chart of a procedure of removing an interference in a multiple antenna system according to another exemplary embodiment of the present invention.

FIG. 4 illustrates a flowchart for removing an interference in a multiple antenna system according to another exemplary embodiment of the present invention.

Referring to FIG. 4, in step 401, a base station assigns a resource for a sounding code to terminals located in a service cell area, and in step 403, receives sounding codes from relevant terminals. The base station may receive sounding codes from adjacent terminals located in service cell areas of other base stations.

After that, in step 405, the base station estimates an uplink channel using a sounding code. In step 407, the base station applies a ray perturbation method to an interference channel value for each tone to calculate a covariance matrix for each tone.

The ray perturbation method calculates a covariance by generating a virtual interference ray where angular spreading is added. A null width increase effect can be obtained through the ray perturbation method.

The ray perturbation method is described with reference to FIGS. 7A and 7B.

Figure 7A:
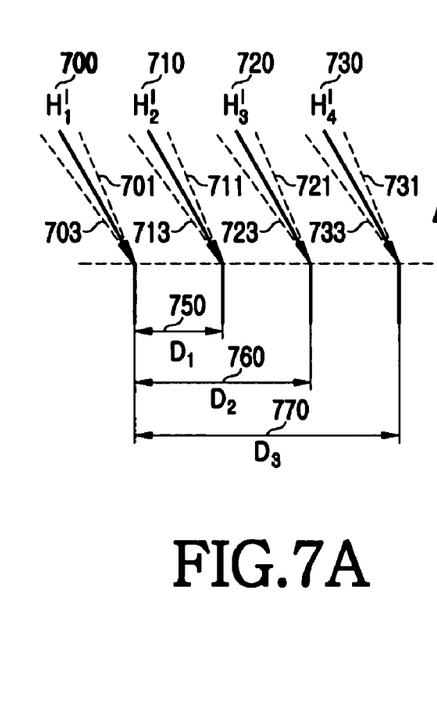
FIGS. 7A & 7B illustrate ray perturbation according to exemplary embodiments of the present invention.
Figure 7B:
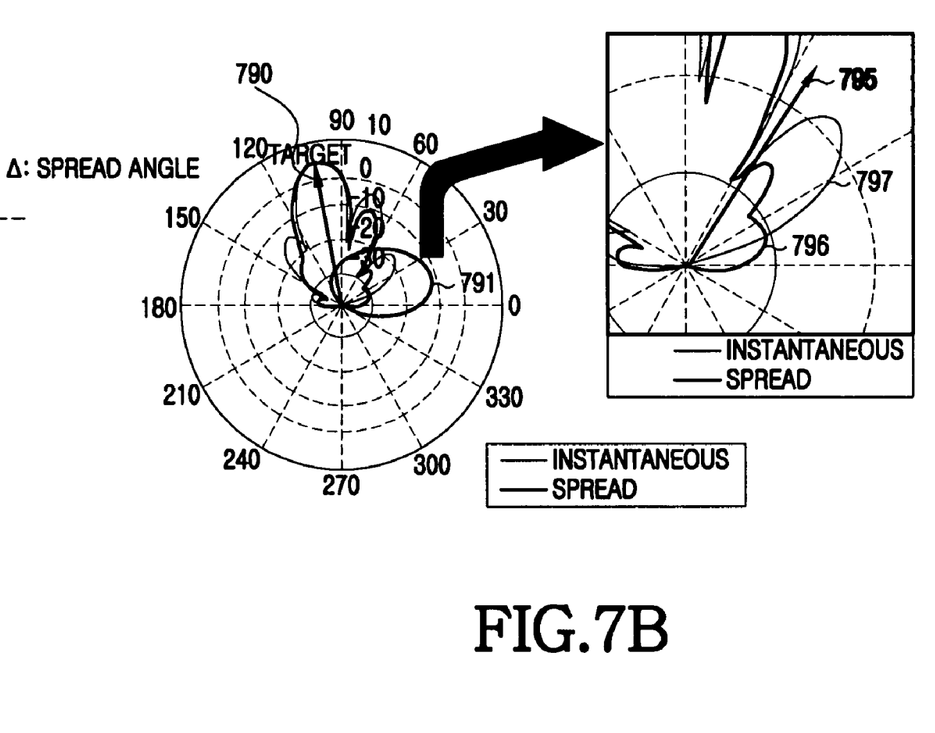

Referring to FIG. 7A, a null width increase effect for a beam as in FIG. 7B can be obtained by changing a beam direction by Δ with respect to each of four antennas, for example, controlling a beam direction 700 of $h_1^i$ for an antenna 1 to a first beam direction 701 and a second beam direction 703, controlling a beam direction 710 of $h_2^i$ for an antenna 2 to a first beam direction 711 and a second beam direction 713, controlling a beam direction 720 of $h_3^i$ for an antenna 3 to a first beam direction 721 and a second beam direction 723, and controlling a beam direction 730 of $h_4^i$ for an antenna 4 to a first beam direction 731 and a second beam direction 733. FIG. 7B compares a case where a ray perturbation method has been applied with a case where the ray perturbation method has not been applied. Bold solid line represents the case where the ray perturbation has been applied. d1 750 is a distance between a first antenna and a second antenna, d2 760 is a distance between the first antenna and a third antenna, and d3 770 is a distance between a first antenna and a fourth antenna.

For example, a beam is formed to a target terminal 790 between ninety (90) degrees and one-twenty (120) degrees, and a beam 791 is formed small with respect to an adjacent terminal in a direction of about thirty (30) degrees. Enlarging a beam for an adjacent terminal again shows that a beam size should be small so as not to generate interference to a direction 795 of the adjacent terminal. Particularly, comparison of a case 796 where the ray perturbation method has been applied with a case 797 where the ray perturbation method has not been applied shows that a beam size becomes smaller when the ray perturbation method has been applied. That is, a null width increase effect can be obtained. Therefore, interference is not generated much to an adjacent terminal.

When the ray perturbation method is applied to an interference channel value for each tone, a covariance matrix R is given by Equations 7A through 7C:

$$R_{perturb} = \frac{1}{3}\sum_{n=0}^{2} h_n^i (h_n^i)^H + \sigma^2 I. \quad [\text{Eqn. 7A}]$$

$$= \frac{1}{3}(R^- + R + R^+) + \sigma^2 I. \quad [\text{Eqn. 7B}]$$

$$R_{perturb} = \frac{1}{3}\begin{bmatrix} 3h_1 h_1^* & \{1+2\cos(\phi_1-\phi_2)\}h_1 h_2^* & \{1+2\cos(\phi_1-\phi_3)\}h_1 h_3^* & \{1+2\cos(\phi_1-\phi_4)\}h_1 h_4^* \\ \{1+2\cos(\phi_2-\phi_1)\}h_2 h_1^* & 3h_2 h_2^* & \{1+2\cos(\phi_2-\phi_3)\}h_2 h_3^* & \{1+2\cos(\phi_2-\phi_4)\}h_2 h_4^* \\ \{1+2\cos(\phi_3-\phi_1)\}h_3 h_1^* & \{1+2\cos(\phi_3-\phi_2)\}h_3 h_2^* & 3h_3 h_3^* & \{1+2\cos(\phi_3-\phi_4)\}h_3 h_4^* \\ \{1+2\cos(\phi_4-\phi_1)\}h_4 h_1^* & \{1+2\cos(\phi_4-\phi_2)\}h_4 h_2^* & \{1+2\cos(\phi_4-\phi_3)\}h_4 h_3^* & 3h_4 h_4^* \end{bmatrix} + \sigma^2 I \quad [\text{Eqn. 7C}]$$

In Equations 7A through 7C, n is an index representing a beam direction (a reference beam direction, a first beam direction, and a second beam direction), $h_n^i(m)$ is an estimated second channel, $(\bullet)H$ represents Hermitian matrix, I is a unit vector, $\sigma$ is a noise variance, R is a reference covariance matrix, $R^-$ is a covariance matrix for the first beam direction, $R^+$ is a covariance matrix for the second beam direction, $\phi_1=0$, $\phi_2=\angle\{kd_1 \sin(\Delta/2)\}$, $\phi_3=\angle\{kd_2 \sin(\Delta/2)\}$, $\phi_4=\angle\{kd_3 \sin(\lambda/2)\}$, $k=2\pi/\lambda$, and $\Delta$ is a spread angle.

Though four antennas and the ray perturbation have been described using a covariance matrix for the first beam direction and the second beam direction as an example in the present invention, a covariance matrix for N antennas and m beam directions can be applied.

Then, in step 409, the base station calculates a beam coefficient w using the covariance matrix (refer to Equation 6). As illustrated in FIG. 3, the covariance matrix R obtained using the ray perturbation method can be processed as an average value.

Thereafter, in step 411, the base station forms a beam using a beam coefficient and transmits data to a relevant terminal.

Then, the base station ends an interference removal procedure.

Figure 5:
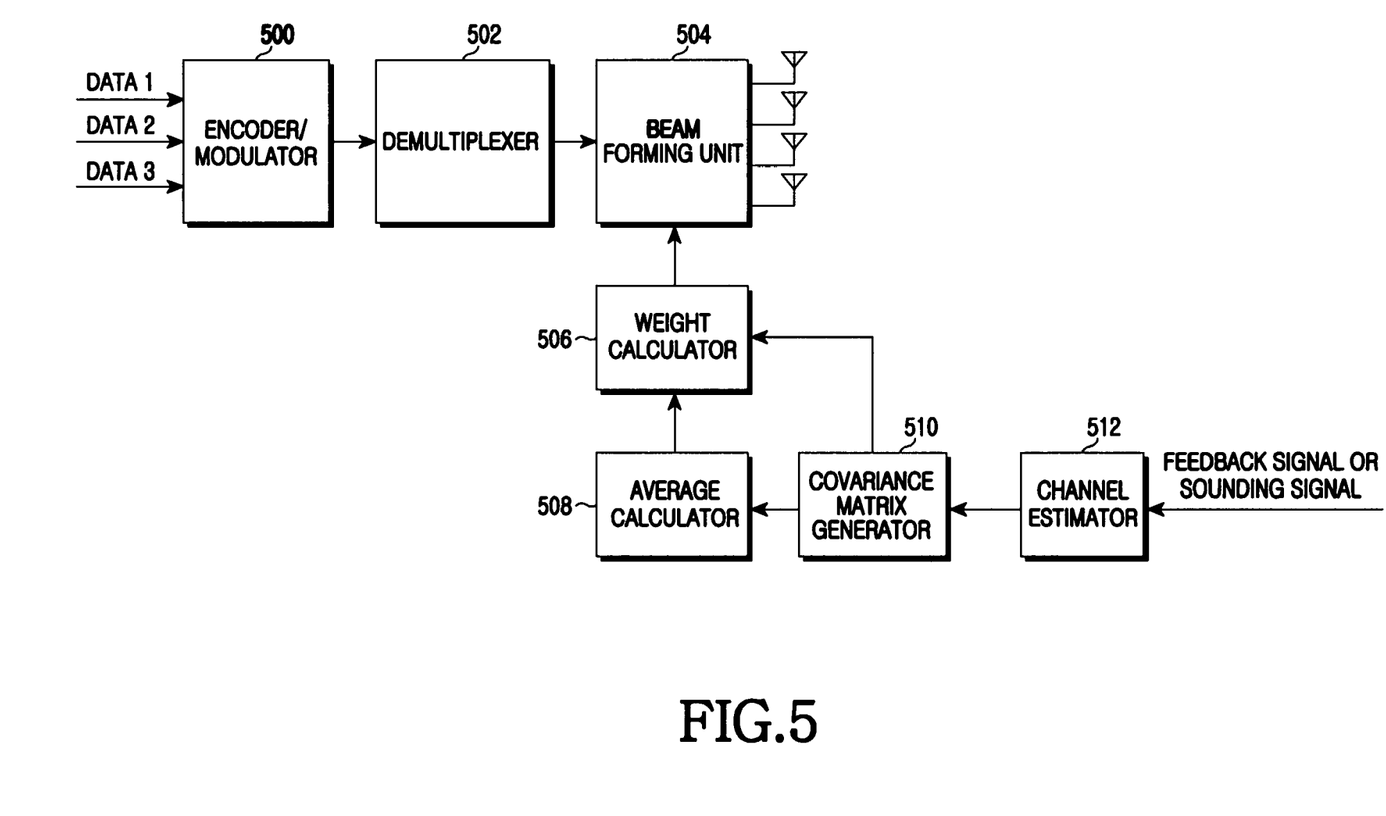
FIG. 5 illustrates a block diagram of an apparatus for removing interference in a multiple antenna system according to an exemplary embodiment of the present invention.

FIG. 5 is a block diagram of an apparatus for removing interference in a multiple antenna system according to an exemplary embodiment of the present invention;

Referring to FIG. 5, a transmission unit of a base station includes an encoder/modulator 500, a demultiplexer 502, a beam forming unit 504, a weight calculator 506, an average calculator 508, a covariance matrix generator 510, and a channel estimator 512.

The encoder/modulator 500 encodes and modulates transmission data according to a relevant modulation level (for example, a Modulation and Coding Scheme (MCS) level). The demultiplexer 502 demultiplexes modulated symbols provided from the encoder/modulator 500 and outputs the same.

The channel estimator 512 estimates a channel for a service cell and an interference channel for an adjacent cell using sounding signals via a plurality of antennas. Regarding the channel estimation, interference channel estimation can be performed for each predetermined tone or each band with respect to each antenna as illustrated in FIG. 6.

The covariance matrix generator 510 generates a covariance matrix as an average value from the interference channel, or generates a covariance matrix by applying a ray perturbation method to an interference channel for each antenna as illustrated in FIG. 7. The covariance matrix is a matrix representing a correlation degree between channels for each of antennas.

Though a covariance matrix generated by applying a ray perturbation method can be directly used in order to obtain a beam coefficient, the beam coefficient can be calculated by obtaining an average for each tone or each band through the average calculator 508 with respect to a covariance matrix generated by applying the ray perturbation method depending on realization.

The weight calculator 506 calculates a beam coefficient using the covariance matrix as in Equation 6. The beam forming unit 504 forms a beam using the beam coefficient with respect to a signal output from the demultiplexer 502.

Figures 8A, 8B, 8C:
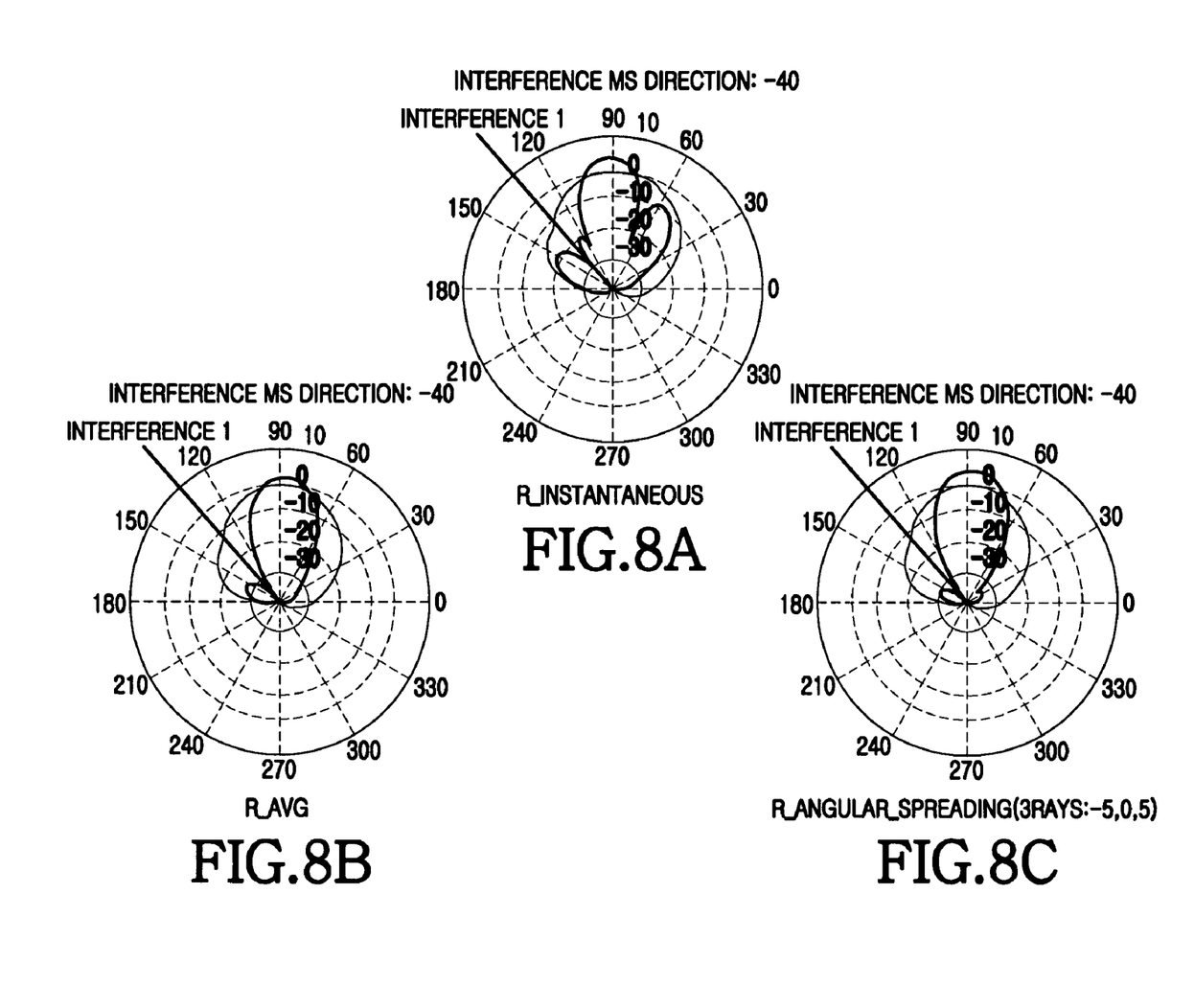
FIGS. 8A through 8C illustrate graphs comparing beam patterns of a conventional art with those of the present invention.

FIGS. 8A through 8C illustrate graphs comparing beam patterns of a conventional art with those of the present invention.

FIG. 8A illustrates a beam forming pattern when a covariance according to an instantaneous channel change is used in a conventional art, FIG. 8B illustrates a beam forming pattern when a covariance according to an average value of the present invention is used, and FIG. 8C illustrates a beam forming pattern when a covariance according to ray perturbation is used.

According to a method of the present invention, it is revealed that a nulling width increases in an interference direction. It is revealed that a nulling width increases in the direction of an interference 1 in FIG. 8B/FIG. 8C compared to the case of FIG. 8A.

Figure 9:
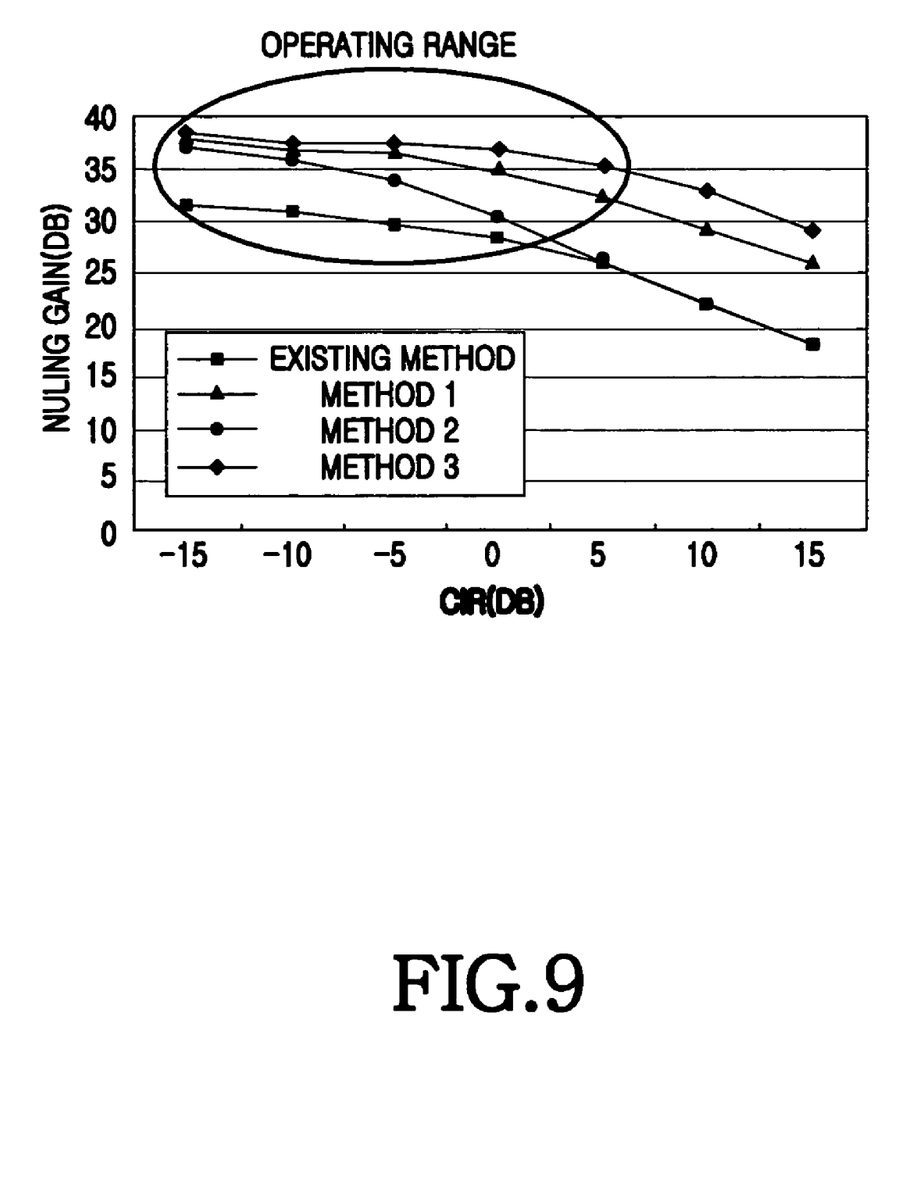
FIG. 9 illustrates a graph for performance according to an exemplary embodiment of the present invention.

FIG. 9 illustrates a performance graph according to an exemplary embodiment of the present invention.

In FIG. 9, a horizontal axis represents Carrier-to-Interference Ratio (CIR) values and a vertical axis represents nulling gains (dB). A nulling gain is a ratio of power for a target terminal to power for an interference terminal, and CIR is comparison of signal size of a target terminal with signal size of an interference terminal. CIR=0 [dB] means that the signal size of a target terminal and the signal size of an interference terminal are the same. When a CIR value is a positive number, the signal size of a target terminal is larger. When a CIR value is a negative number, the signal size of an interference terminal is larger. Here, method 1 obtains a covariance according to an average value as in FIG. 3 to form a beam, method 2 applies ray perturbation as in FIG. 4 to form a beam, and method 3 obtains an average with respect to a covariance calculated using ray perturbation in method 2 to form a beam.

Nulling grains are represented for the case where beam patterns of FIGS. 8A to 8C are applied. It is revealed that a performance gain of 7 dB or more at the maximum is accomplished in comparison with an existing method within an operating range.

As described above, an interference removal performance can be improved against fast channel change by obtaining a covariance matrix as an average value for each tone or each band, or by applying a ray perturbation method to an interference matrix value for each tone and obtaining a covariance matrix for each tone or each band in a multiple antenna system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for removing interference in a multiple antenna system, the apparatus comprising:
   a channel estimator configured to estimate a channel for a service cell using a first sounding signal of a first Mobile Station (MS) of a serving cell via a plurality of antennas and estimating an interference channel based on at least one second sounding signal of at least one second MS of an adjacent cell by removing the estimated first sounding signal from a received signal;
   a covariance matrix generator configured to generate a covariance matrix using the estimated interference channel;
   a weight calculator configured to calculate a beam coefficient using the covariance matrix; and
   a beam forming unit configured to form a beam using the beam coefficient.

2. The apparatus of claim 1, wherein the covariance matrix comprises a matrix representing a correlation degree between channels for each of respective antennas.

3. The apparatus of claim 1, wherein the sounding signals comprise a first sounding code from a relevant terminal located in a service area and a second sounding code from adjacent terminals terminal located in a service area of a different base station.

4. The apparatus of claim 1, wherein the estimating of the channel comprises estimating interference channel for each predetermined tone or band of each antenna.

5. The apparatus of claim 1, wherein the beam coefficient is calculated using a first equation, the first equation defined as $$w = h_d^H R^{-1},$$

where w is a beam coefficient, $h_d^H$ is a Hermitian matrix for the channel of the service cell, R is a covariant matrix, and $(\bullet)^{-1}$ denotes an inverse matrix operation.

6. An apparatus for removing interference in a multiple antenna system, the apparatus comprising:
   a channel estimator configured to estimate a channel using a first sounding signal of a first Mobile Station (MS) of a serving cell via a plurality of antennas and estimating an interference channel based on at least one second sounding signal of at least one second MS of an adjacent cell by removing the estimated first sounding signal from a received signal;
   a covariance matrix generator configured to generate a covariance matrix by applying a ray perturbation method to the estimated interference channel for each antenna;
   a weight calculator configured to calculate a beam coefficient using the covariance matrix; and
   a beam forming unit configured to form a beam using the beam coefficient.

7. The apparatus of claim 6, wherein the ray perturbation method generates a first covariance matrix (R) for a reference interference channel estimated for each antenna, and at least one second covariance matrix ($R^+$, $R^-$) by deviating left and right by a predetermined angle from a beam direction of the reference interference channel.

8. The apparatus of claim 6, wherein the beam coefficient is calculated by obtaining an average for each predetermined tone or band with respect to the covariance matrix calculated by applying the ray perturbation method.

9. The apparatus of claim 6, wherein the beam coefficient is calculated using a first equation, the first equation defined as $$w = h_d^H R^{-1},$$

where w is a beam coefficient, $h_d^H$ is a Hermitian matrix for the channel of the service cell, R is a covariant matrix, and $(\bullet)^{-1}$ denotes an inverse matrix operation.

10. The apparatus of claim 6, wherein the estimating of the channel comprises estimating interference channel for each predetermined tone or band of each antenna.

11. A method for removing interference in a multiple antenna system, the method comprising:
    estimating a channel using a first sounding signal of a first Mobile Station (MS) of a serving cell via a plurality of antennas and estimating an interference channel based on at least one second sounding signal of at least one second MS of an adjacent cell by removing the estimated first sounding signal from a received signal;
    generating a covariance matrix using the estimated interference channel;
    calculating a beam coefficient using the covariance matrix; and
    forming a beam using the beam coefficient.

12. The method of claim 11, wherein the covariance matrix comprises a matrix representing a correlation degree between channels for each of respective antennas.

13. The method of claim 11, wherein the sounding signals comprise a first sounding code from a relevant terminal located in a service area and a second sounding code from an adjacent terminal located in a service area of a different base station.

14. The method of claim 11, wherein the estimating of the channel comprises estimating an interference channel for each predetermined tone or band of each antenna.

15. The method of claim 11, wherein the beam coefficient is calculated using a first equation, the first equation defined as $$w = h_d^H R^{-1},$$

where w is a beam coefficient, $h_d^H$ is a Hermitian matrix for the channel of the service cell, R is a covariant matrix, and $(\bullet)^{-1}$ denotes an inverse matrix operation.

16. A method for removing an interference in a multiple antenna system, the method comprising:

estimating a channel using a first sounding signal of a first Mobile Station (MS) of a serving cell via a plurality of antennas and an interference channel based on at least one second sounding signal of at least one second MS of an adjacent cell by removing the estimated first sounding signal from a received signal;

generating a covariance matrix by applying a ray perturbation method to the estimated interference channel for each antenna;

calculating a beam coefficient using the covariance matrix; and forming a beam using the beam coefficient.

17. The method of claim 16, wherein the ray perturbation method generates a first covariance matrix (R) for a reference interference channel estimated for each antenna, and at least one second covariance matrix ($R^+$, $R^-$) by deviating left and right by a predetermined angle from a beam direction of the reference interference channel.

18. The method of claim 16, wherein the beam coefficient is calculated by obtaining an average for each predetermined tone or band with respect to the covariance matrix calculated by applying the ray perturbation method.

19. The method of claim 16, wherein the beam coefficient is calculated using a first equation, the first equation defined by $$w = h_d^H R^{-1},$$

where w is a beam coefficient, $h_d^H$ is a Hermitian matrix for the channel of the service cell, R is a covariant matrix, and $(\bullet)^{-1}$ denotes an inverse matrix operation.

20. The method of claim 16, wherein the estimating of the channel comprises estimating an interference channel for each predetermined tone or band of each antenna.

* * * * *